Figure 1:
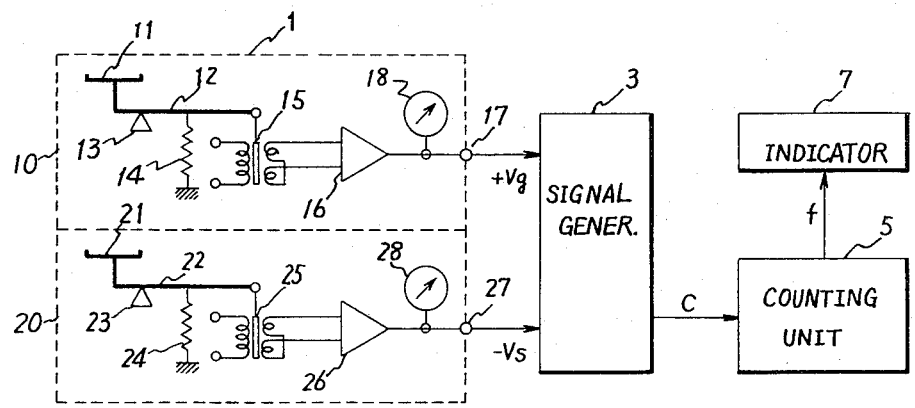

United States Patent [19]
Yamanaka

[11] 3,789,202
[45] Jan. 29, 1974

[54] COUNTING BALANCE

[75] Inventor: Masami Yamanaka, Miki, Japan

[73] Assignee: Yamatos Scale Company, Limited, Hyogo-ken, Japan

[22] Filed: Aug. 23, 1972

[21] Appl. No.: 283,096

[30] Foreign Application Priority Data
Dec. 28, 1971  Japan.................................. 47/3275

[52] U.S. Cl.......... 235/151.33, 177/25, 235/92 CA, 235/92 CC, 235/92 WT
[51] Int. Cl........................................... G01g 19/413
[58] Field of Search......235/151.33, 92 WT, 92 MT, 235/92 TF, 92 FQ, 92 CA, 92 CC, 92 CV, 195, 196; 177/25, 1, 26, 34, 35, 210, 200, DIG. 3

[56] References Cited
UNITED STATES PATENTS

| | | | |
|---|---|---|---|
| 3,712,394 | 1/1973 | Davies et al. ........................... | 177/1 |
| 3,716,706 | 2/1973 | Gray ................................ | 235/151.33 |
| 3,552,511 | 1/1971 | Marcheso et al. ..................... | 177/25 |
| 3,557,891 | 1/1971 | Klopfenstein ....................... | 177/200 |
| 3,681,586 | 8/1972 | Kitaura .............................. | 235/195 |

Primary Examiner—Malcolm A. Morrison
Assistant Examiner—Errol A. Krass
Attorney, Agent, or Firm—Eugene E. Geoffrey, Jr.

[57]  ABSTRACT

A counting balance having means for producing a first voltage proportional to the weight of an unknown number of articles, means for producing a voltage proportional to the weight of a known number of articles, comparing said voltages and producing a train of pulses having a frequency proportional to the ratio of said voltages and then counting the number of pulses during a predetermined interval to determine the number of said unknown articles.

1 Claim, 3 Drawing Figures

COUNTING BALANCE

This invention relates to a counting balance. The term "counting balance" refers to a device using two weighing platforms or cradles and wherein a single article is put on one of said platforms, a plurality of same articles are put on the other platform, and the number of articles on the latter platform is indicated.

While counting balances have been known in the art, prior counting balances have had a mechanical structure utilizing a lever ratio. Such mechanically constructed and mechanically operated devices are not only complicated in structure and, accordingly, substantially expensive, but also are troublesome and time-consuming in operation because they require substantial hand operation.

Therefore, an object of this invention is to provide a novel and improved counting balance which includes an electronic counting mechanism and operates automatically and gives an instantaneous indication.

The counting balance of this invention comprises means for weighing a single article and generating a voltage proportional to the weight of said article, means for weighing an aggregation of said articles and generating another voltage proportional to the total weight of said aggregation, means for generating a train of pulses having a frequency proportional to the ratio of both voltages, means for counting the number of said pulses and means of indicating said number of pulses.

The above and other objects and features of this invention will be more clearly understood from the following description with reference to the accompanying drawings.

Figure 2:
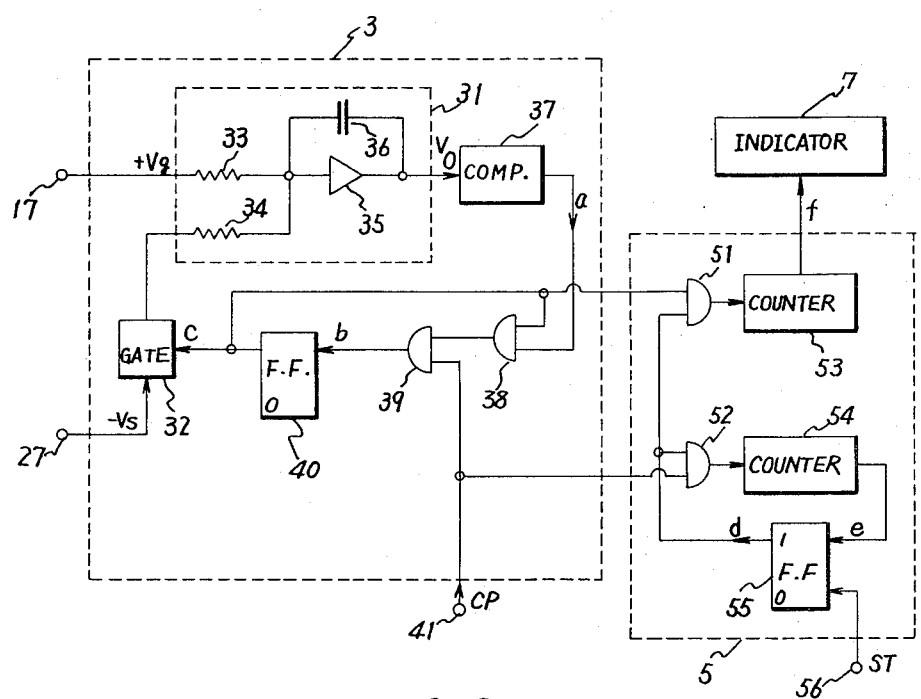
Figure 3:
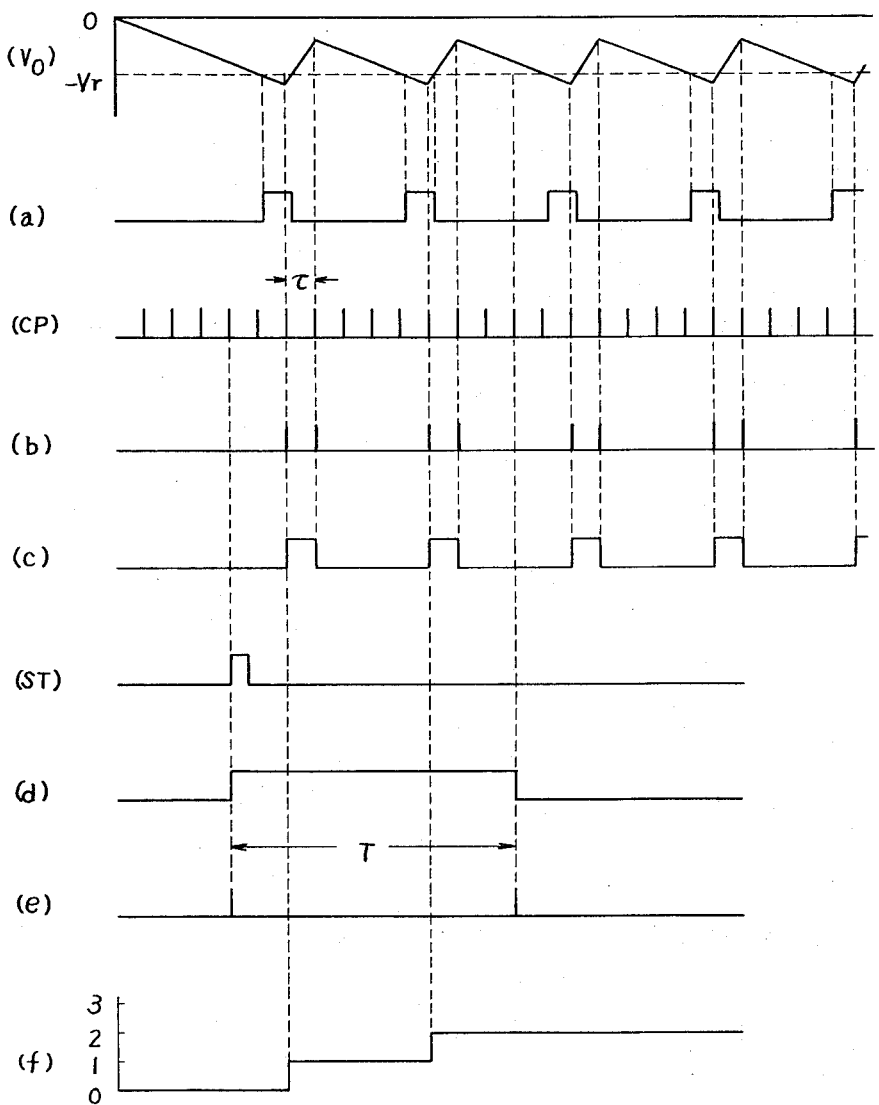

In the Drawings:

FIG. 1 is a block diagram representing one embodiment of a counting balance according to this invention, FIG. 2 is a circuit diagram of a portion of the device of FIG. 1, and FIG. 3 is a waveform diagram representing various signals appearing at various points of the circuit of FIG. 2.

Referring to FIG. 1, the counting balance of this invention comprises a weight unit 1, a signal generating unit 3, a counting unit 5, and an indicating unit 7. The weighing unit 1 consists of two similar sections 10 and 20 including conventional balancing mechanisms comprising platforms or cradles 11 and 21, levers 12 and 22, fulcrums 13 and 23 and springs 14 and 24, differential transformers 15 and 25 having movable cores interlocked with the levers for converting displacements into electric signals, amplifiers 16 and 26 connected to amplify the outputs of the differential transformers and produce outputs at terminals 17 and 27, and voltmeters 18 and 28 for indicating the output voltages.

Although both sections 10 and 20 appear to be quite similar in configuration, the section 10 is used for weighing an aggregation of articles and is arranged to produce a positive output voltage +Vg which is proportional to the total weight of the aggregation. The section 20 is used for weighing a single article and is arranged to produce a negative output voltage −Vs which is proportional to the weight of the single article. Moreover, the components included in both sections 10 and 20 are previously selected so as to satisfy the condition that the magnitude of Vs is always greater than that of Vg, whereby the operational principle of the inventive counting balance is established as described later. In other words, the usable range of the device is limited practically by this condition.

The signal generation unit 3 receives both outputs Vg and −Vs and processes them to produce an output c consisting of a train of pulses having a frequency proportional to the ratio, Vg/Vs. The counting unit 5 counts the number of these pulses within a predetermined time interval to produce a signal $f$ representing the number of articles on the platform or cradle 11 which may then be indicated by the indicating unit 7 in a digital form.

Referring now to FIG. 2, embodiments of the signal generating unit 3 and counting unit 5 are shown enclosed in broken lines. The signal generating unit 3 includes an adder integrator 31 including an operation amplifier 35, the input of which is connected through an integration resistor 33 to the output terminal 17 of the weighing section 10, and also through an integration resistor 34 and a normally closed gate 32 to the output terminal 27 of the weighing section 20. An integration capacitor 36 is connected across the operation amplifier 35. The output of the operation amplifier 35 is connected through a comparator 37 to one input of an OR gate 38 the other input of which is the output of flip-flop 40. The output of the flip-flop 40 is also coupled to the control terminal of the gate 32. The output of the OR gate 38 is applied to one input of an AND gate 39, the other input of which is a clock pulse from an input terminal 41. The output of the AND gate 39 is connected to the input of the flip-flop 40. The comparator 37 is so arranged that it produces an output O when the magnitude of the input is less than a predetermined value Vr and 1 when it exceeds the value Vr.

The counting unit 5 includes AND gates 51 and 52 and counters 53 and 54 connected respectively to the outputs of the gates 51 and 52. The output of the counter 54 is coupled to one input of a flip-flop 55 another input of which is connected to a start pulse input terminal 56. The output of the flip-flop 55 is connected to the inputs of the AND gates 51 and 52. The other input terminal of the AND gate 51 is connected to the output of the flip-flop 40 of the signal generating unit 3 and the other input of the AND gate 52 is connected to the clock pulse input terminal 41. The output of the counter 53 is coupled to the indicating unit 7 such as the digital indicator.

Now, the operation of the inventive counting balance will be described in detail with reference to the circuit of FIG. 2 and the waveforms of FIG. 3.

Assuming that a single article is first put on the platform 21 and then an aggregation of the same articles are put on the platform 11, only the +Vg is applied at first to the adder integrator 31 through the terminal 17 because the gate 32 is normally closed to block the input −Vs from the terminal 27. Therefore, as is well known in the art, the output voltage $V_0$ of the operation amplifier is represented by the following equation.

$$V_0 = -\frac{1}{R_1 C} \int_0^t V_g dt \tag{1}$$

Where $R_1$ is resistance of the integration resistor 33, C is capacitance of the integration capacitor 36 and $t$ is time. When the weighing mechanism of the balance is at rest, the output voltage Vg is constant. Therefore, $$V_0 = -1/R_1C\ Vg \cdot t \tag{2}$$

According to Equation (2), the value $V_0$ decreases linearly from zero with a lapse of time as shown in FIG. 3, waveform $V_0$. When it reaches the predetermined reference level $-Vr$, the comparator 37 produces an output 1 which is transferred through the OR gate 38 to the AND gate 39 to enable it. In this condition, a clock pulse CP supplied from the input terminal 41 passes the AND gate 39 and triggers the flip-flop 40 into 1 state. Then, the 1 output of the flip-flop 40 is applied to the control terminal of the normally closed gate 32 to open it. Consequently, the output voltage $-Vs$ from the output terminal 27 of the weighing section 20 (FIG. 1) enters the adder integrator 31 through the gate 32.

Therefore, the adder integrator 31 now has two inputs $Vg$ and $-Vs$ at the same time and the output voltage $V_0$ is determined by the following equation.

$$V_0 = -1/R_1C\ Vg \cdot t + 1/R_2C\ Vs \cdot t \tag{3}$$

Where $R_2$ is resistance of the integration resistor 34. If it is arranged so that $R_1 = R_2 = R$, $$V_0 = -1/R\ C\ (Vg - Vs)\ t$$
$$= 1/R\ C\ (Vs - Vg)\ t \tag{4}$$

As the difference $(Vs - Vg)$ is always positive as mentioned above, Equation (4) indicates that the value $V_0$ begins to increase in response to the above clock pulse.

When the value $V_0$ exceeds the reference level $Vr$ during its increase, the output of the comparator 37 is switched to 0 state. However, since the 1 output of the flip-flop 40 is returned to the other input of the OR gate 38, the AND gate 39 is still enabled thereby and the next clock pulse passes the AND gate 39 and switches the flip-flop 40 to 0 state. Accordingly, the gate 32 is closed and the input $Vs$ is interrupted and, therefore, the value $V_0$ begins to decrease again in accordane with Equation (2). The same operation is repeated with lapse of time and the output voltage $V_0$ of the adder integrator 31 produces a saw-tooth waveform along the reference level $-Vr$, as shown in FIG. 3, waveform $V_0$. In response to such a saw-tooth input, the comparator 37 produces a square waveform $a$ and an intermittent input pulse train $b$ of the flip-flop 40 is produced by the waveform $a$ and the clock pulse CP. Therefore, a square waveform $c$ is fed from the flip-flop 40 and, accordingly, from the signal generator 3.

When a start signal ST is applied to the start signal terminal 56 and thus to the flip-flop 55 of the counting unit 5, the flip-flop 55 is set into 1 state and the 1 output thereof is applied to the AND gates 51 and 52. In this condition, the clock pulse train CP passes the AND gate 52 and the clock pulses are counted by the counter 54. When the count reaches a predetermined value, for example, ten, the counter 54 produces a pulse which is, in turn, applied to the flip-flop 55 to reset it into 0 state. During the set condition of the flip-flop 55, the square pulses c from the signal generator 3 pass the AND gate 51 and are counted by the counter 53 and the count output $f$ is applied to the indicating unit such as digital indicator to be indicated.

The counter 54 is previously set to produce a pulse $e$ at every T period and assuming that K number of pulses are counted during the period T, K can be indicated in the following manner.

Since the pulse width of the output pulse C of the signal generator 3 is equal to the period $\tau$ of the clock pulse CP and also corresponds to the increasing period of the value $V_0$, the decrement of $V_0$ during the period T is given by Equation (2) as follows:

$$V_{0d} = -1/R\ C\ Vg\ (T - K\tau)$$

Furthermore, the increment of $V_0$ during the period T is given by Equation (4) as follows:

$$V_{0i} = 1/R\ C\ (Vs - Vg)\ K \cdot \tau$$

It is clear that both the increment and decrement of $V_0$ are nearly equal to each other within the period T. Therefore, $$Vg\ (T - K\tau) = (Vs - Vg)\ K\tau$$

Then, $$Vg \cdot T = K \cdot Vs \cdot \tau$$

Therefore, $$K = T/\tau \cdot Vg/Vs \tag{5}$$

Equation (5) teaches that the count of the counter 53, that is, the frequency of the output signal $c$ of the signal generating unit 3 is proportional to the voltage ratio $Vg/Vs$.

Defining the transformation constant for transforming the weight of the aggregation as voltage A and the transformation constant for transforming the weight of the single article as voltage B, and denoting the weight of the single article as W and the number of articles included in the aggregation as N, the following equations are obtained.

$$Vg = A \cdot N \cdot W \tag{6}$$

$$Vs = B \cdot W$$

Using these equations in Equation (5), $$K = T/\tau \cdot A\ N/B \tag{7}$$

Accordingly, if the components are selected so that a relation $$T/\tau \cdot A/B = 1 \tag{8}$$

is fulfilled, $$K = N \tag{9}$$

This indicates that the indicator 7 indicates the number of articles included in the aggregation.

For instance, if it is selected that $\tau = 1$ millisecond and $T = 1$ second, the lever ratios of the levers 12 and 22 and the amplification factors of the amplifiers 16 and 26 may be selected so that a relation $A/B = 1/1000$ is fulfilled. A satisfactory result has been obtained in practice by selecting that $T = 0.1$ to 0.5 second and $\tau = 0.01$ to 0.1 millisecond.

As described in the above, according to this inventive counting balance, measurement of the number of articles in an aggregation can be automatically and instantaneously carried out without the necessity of any hand work and, therefore, the efficiency of such an operation is remarkably improved.

It is of course understood that many variations, modifications and changes may be made without departing from the scope of this invention as defined in the appended claims. For example, other types of weighing mechanisms such as pendulum and piezoelectric types may be adopted instead of the lever-spring mechanism. Further, M number of articles may be put on the platform 21 instead of a single article if necessary. In this case, the output of the weighing section 20 for a single article may be divided by M before being applied to the operation amplifier 35 or the input frequency or the count of the counter 53 may be multiplied by M.

What is claimed is:

1. A counting balance comprising means for weighing a single article and generating a negative voltage having a magnitude proportional to the weight of said article, means for weighing an aggregation of the same articles and generating a positive voltage having a magnitude proportional to the total weight of said aggregation of the same articles but less than that of said negative voltage, an adder integrator provided with a normally closed gate and having a first input for directly receiving said positive voltage and a second input for receiving said negative voltage through said gate, a comparator for comparing the output of said adder integrator with a predetermined reference level and generating a signal when the magnitude of said output exceeds said reference level, means for generating a pulse having a predetermined duration in response to said signal, said pulse being applied to the control terminal of said gate for opening said gate for said duration, whereby the output of said adder integrator repeatedly decreases and increases across said reference level and said pulse generating means produces a train of pulses, means for counting the number of said pulses appearing within a predetermined time interval, and an indicator for indicating said number of pulses.

* * * * *